US007014907B2

(12) United States Patent
Kobayashi et al.

(10) Patent No.: US 7,014,907 B2
(45) Date of Patent: Mar. 21, 2006

(54) MULTILAYER MOLDED ARTICLES

(75) Inventors: Yoshitaka Kobayashi, Ichihara (JP); Nobuhiro Usui, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/224,551

(22) Filed: Aug. 21, 2002

(65) Prior Publication Data

US 2003/0003259 A1 Jan. 2, 2003

Related U.S. Application Data

(63) Continuation of application No. 09/770,502, filed on Jan. 29, 2001, now abandoned.

(30) Foreign Application Priority Data

Feb. 16, 2000 (JP) ............................ 2000-037588

(51) Int. Cl.

| | |
|---|---|
| ***B32B 3/04*** | (2006.01) |
| ***B32B 23/02*** | (2006.01) |
| ***B62C 1/00*** | (2006.01) |
| ***B60J 1/06*** | (2006.01) |
| ***B60J 1/02*** | (2006.01) |

(52) U.S. Cl. ...................... 428/192; 428/121; 428/198; 428/33; 428/53; 428/57; 428/45; 428/61; 296/1.08; 296/87; 296/90; 296/146.7; 264/248; 264/249; 264/252; 264/138; 264/257

(58) Field of Classification Search ................ 428/192, 428/121, 33, 198, 53, 45, 57, 61; 264/138, 264/257, 248, 249, 252; 296/1.08, 87, 90, 296/146.7

See application file for complete search history.

(56) References Cited

U.S. PATENT DOCUMENTS

| | | | | |
|---|---|---|---|---|
| 5,509,990 A | | 4/1996 | Masui et al. | |
| 5,759,464 A | * | 6/1998 | Matsumoto et al. | 264/138 |
| 5,962,034 A | * | 10/1999 | Matsumoto et al. | 425/111 |
| 6,318,783 B1 | * | 11/2001 | Knox | 296/39.1 |

FOREIGN PATENT DOCUMENTS

| | | |
|---|---|---|
| JP | 06-344770 A | 12/1994 |

* cited by examiner

*Primary Examiner*—Rena Dye
*Assistant Examiner*—Lawrence Ferguson
(74) *Attorney, Agent, or Firm*—Fitch Even Tabin & Flannery

(57) ABSTRACT

Disclosed is a multilayer molded article comprising a thermoplastic resin substrate and at least two kinds of skin materials laminated on a surface of the substrate, the at least two kinds of skin materials including a pair of skin materials adjacent to each other wherein the pair of skin materials are folded toward the substrate to have folded edges which separate the substrate at least partly to define two portions, wherein the separated portions of the substrate are combined together via a plurality of ribs of the thermoplastic resin molded integrally with the substrate, the ribs enclosing therein a part of the folded edges of the pair of skin materials.

3 Claims, 5 Drawing Sheets

DRAWINGS

MULTILAYER MOLDED ARTICLES

RELATED APPLICATIONS

This application is a continuation in part of U.S. application Ser. No. 09/770,502, filed Jan. 29, 2001 abandoned, the complete disclosure of which is incorporated herein by reference.

BACKGROUND OF THE INVENTION

1. Field of the Invention

The present invention relates to a multilayer molded article comprising a substrate made of a thermoplastic resin and at least two kinds of skin materials laminated on the surface of the substrate wherein the at least two kinds of skin materials include a pair of skin materials adjacent to each other.

2. Description of the Prior Art

Heretofore, multilayer molded articles comprising a substrate made of a thermoplastic resin and skin materials laminated on the surface of the substrate have been used in a wide variety of fields such as automotive interior parts (e.g. door trims and instrument panels) and interior and exterior parts of household appliances.

In the field of such multilayer molded articles, with recent diversification of needs, there is a growing demand for multilayer molded articles comprising a substrate made of a thermoplastic resin and two kinds of skin materials laminated on the surface of the substrate wherein the two skin materials are adjacent to each other.

In a method for obtaining such multilayer molded articles, two parts each of which comprises a substrate made of a thermoplastic resin and a skin material laminated on the surface of the substrate are produced separately by a conventional technique such as injection molding and compression molding, and both parts are jointed together with fitting means or with a screw at edges of the substrates of the parts as illustrated in FIG. 12. In some cases, the two parts are welded together at the edges jointed. In another method, a skin material is laminated on a surface of a substrate made of a thermoplastic resin by injection molding or compression molding and then another skin material is laminated over the foregoing skin material using an adhesive, etc. with the additional skin material partly overlapping with the underlying skin material (FIG. 13).

However, a multilayer molded article produced by the former method is insufficient in joint strength between the substrates because a strong joint between the two kinds of substrates can not be achieved. In the case where the substrates are welded together, there arise problems including deterioration of product's appearance resulting from deformation of the substrates or deformation of the skin materials caused by the heat applied to the substrates because heat is applied directly to the parts molded. When a multilayer molded article is produced by the latter method, there arises a problem of delamination of the skin materials.

SUMMARY OF THE INVENTION

Under such circumstances, the present inventors have reached the present invention through their study for developing a multilayer molded article comprising a substrate made of a thermoplastic resin and at least two kinds of skin kinds of materials laminated on the surface of the substrate, the at least two kinds of skin materials including a pair of skin materials adjacent to each other, wherein the skin materials are strongly stuck to the substrate and the portions of the substrate on which the pair of skin materials are laminated are jointed strongly and, as a result, the molded article has high strength and also has good appearance.

The present invention provides a multilayer molded article comprising:

a thermoplastic resin substrate having a first surface and a second surface opposite to the first surface, and at least two kinds of skin materials laminated on the first surface of the substrate, the at least two kinds of skin materials including a pair of skin materials adjacent to each other wherein the pair of skin materials are folded, along a line along which the pair of skin materials meet together, toward the substrate to have folded edges which separate the substrate at least partly to define a portion on which one of the pair of skin materials is laminated and another portion on which the other one of the pair of skin materials is laminated, wherein the separated portions of the substrate are combined together via a plurality of ribs of the thermoplastic resin molded integrally with the substrate, the ribs enclosing therein a part of the folded edges of the pair of skin materials.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Hereinafter, the present invention is described in detail by reference to the drawings.

The following description provides examples of the present invention and the invention is not limited to the examples.

Figure 1:
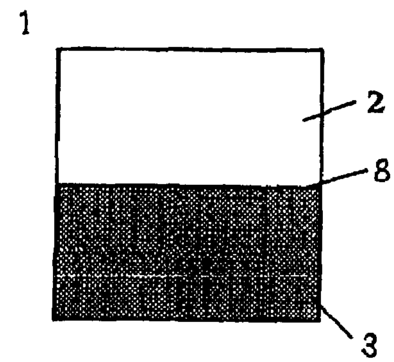
FIG. 1 shows a plan view of an example of the multilayer molded article of the present invention when viewed from the skin material side.

FIG. 1 is a plan view of a multiplayer molded article (1), which is an example of the multilayer molded article of the present invention, comprising a substrate and two kinds of skin materials, a first and second skin materials, laminated to a surface of the substrate. The skin materials are adjacent to each other. The substrate is made of a thermoplastic resin, and is a first surface and a second surface opposite to the first surface. In this example, the substrate has two portions, one of which has the first skin material (2) laminated on its first surface and the other of which has the second skin material (3) laminated on its first surface. The first and second skin materials meet together along a meeting line (8), and are stuck to the first surfaces of the first and second portions of the substrate, respectively, without using any adhesive.

Figure 2:
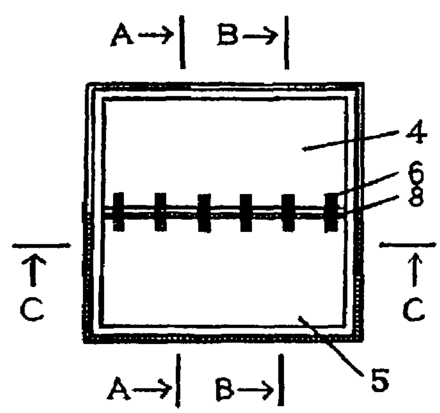
FIG. 2 shows the multilayer molded article shown in FIG. 1 when viewed from the back thereof.

FIG. 2 shows the multilayer molded article (1) viewed from the back thereof The first portion (4) of the substrate and the second portion (5) of the substrate have, on their second surfaces, a plurality of ribs (6) bridging both the portions. The ribs are molded integrally with the portions (4), (5) of the substrate from the thermoplastic resin of the substrate. The first and second skin materials (2), (3) are folded along the meeting line (8) toward the substrate to have folded edges (10) which overlap each other. The folded edges (10) of the first and second skin materials (2), (3) separate the substrate into two portions, namely, the first and second portions (4), (5). Each of the ribs (6) encloses therein a part of the folded edges (10) of the skin materials.

In drawings including FIG. 2, ribs (6) are smeared so as to be easily recognized as distinct from the substrate, but actually, the ribs are molded and completely integrated with a substrate.

Figure 3:
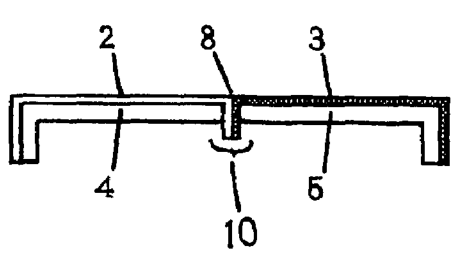
FIG. 3 is an A—A sectional view of the multilayer molded article shown in FIG. 2.
Figure 4:
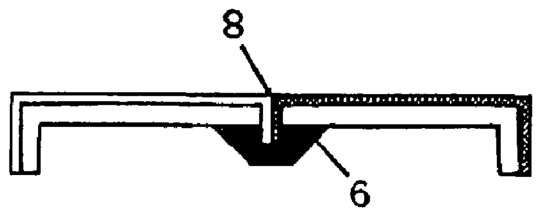
FIG. 4 is a B—B sectional view of the multilayer molded article shown in FIG. 2.
Figure 5:
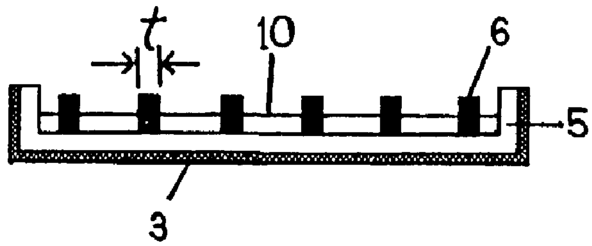
FIG. 5 is a C—C sectional view of the multilayer molded article shown in FIG. 2.

FIGS. 3, 4 and 5 illustrate this state in detail.

FIG. 3 shows a section, along line A—A shown in FIG. 2, of the multilayer molded article shown in FIG. 2, where the first portion (4) of the substrate underlying the back of the first skin material (2) and the second portion (5) of the substrate underlying the back of the second skin material (3) are not combined via the ribs (6). In this section illustrated, the folded edges (10) of the first and second skin material (2), (3) are present between the two portions (4), (5) of the substrate, separating the substrate into the two portions.

FIG. 4 shows a section, along line B—B shown in FIG. 2, of the multilayer molded article shown in FIG. 2, where the first portion (4) of the substrate underlying the back of the first skin material (2) and the second portion (5) of the substrate underlying the back of the second skin material (3) are combined via the ribs (6). As shown in the drawing, ribs (6) are formed integrally with both portions (4), (5) of the substrate in such a manner that the folded edges (10) of the skin materials extending from the meeting line (8) are enclosed in the ribs. Both the portions (4), (5) of the substrate are combined together via the ribs (6).

FIG. 5 is a sectional view, along line C—C shown in FIG. 2, of the multilayer molded article shown in FIG. 2, viewed from the side of the second portion (5) of the substrate underlying the back of the second skin material (3). The width of the ribs (6) is indicated by "t" in the drawing. The ribs are arranged at suitable intervals.

Figure 6:
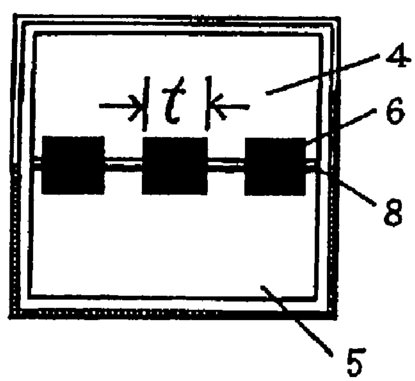
FIG. 6 shows another example of the multilayer molded article shown in FIG. 1 when viewed from the back thereof.
Figure 7:
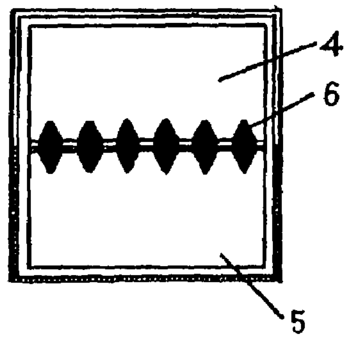
FIG. 7 shows another example of the multilayer molded article shown in FIG. 1 when viewed from the back thereof.

The form of the ribs (6) is not particularly limited insofar as the first and second portions of the substrate can be combined together via the ribs. The ribs (6) may have a large width as shown in FIG. 6 or a varying width as shown in FIG. 7. Further, the ribs may be in combination of those of different shapes.

With regard to the intervals between the ribs (6), the ribs are only required to be arranged at intervals such that the strength of the product is not lowered, and the intervals between the ribs may be determined depending on the shape of the product and the width and shape of each rib. Therefore, the ribs (6) may be arranged at regular intervals or varying intervals. However, if the width (t) of the ribs is too large, sink marks occur easily in the surface of the product in the course of molding, or the location of the meeting line (8) between the two skin materials may deviate and thereby the meeting line (8) often meanders. On the other hand, if the width of the ribs is too small, the strength of the product tends to be insufficient. Accordingly, for achieving higher quality of appearance and higher strength, it is preferable to make the width of the ribs as large as possible as long as no sink marks are formed in the surface of the product or no meander of the meeting line between the skin materials is formed FIG. 8 shows an example of the multilayer molded article having a top view the same as that shown in FIG. 1 wherein a first portion (4) of a substrate underlying a first skin material (2) and a second portion (5) of the substrate underlying a second skin material (3) are combined in a manner different than that shown in FIGS. 2 to 7.

Figure 8:
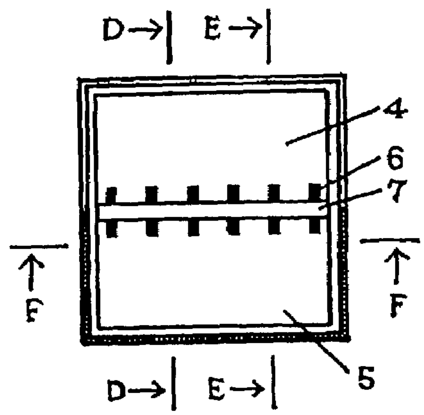
FIG. 8 shows another example of the multilayer molded article shown in FIG. 1 when viewed from the back thereof.

In the embodiment shown in FIG. 8, the first portion (4) of the substrate underlying the first skin material (2) and the second portion (5) of the substrate underlying the second skin material (3) are combined via ribs (6), and simultaneously, the ribs (6) are also combined via a resin bridge (7) which has been molded integrally with the ribs (6) and the portions (4), (5) of the substrate so as to be located away from the second surface of the substrate and which extends across the ribs. This structure is preferable because the product as a whole has a strength greater than that of a product in which two portions of its substrate are combined via ribs which are not combined via a resin bridge.

Figure 9:
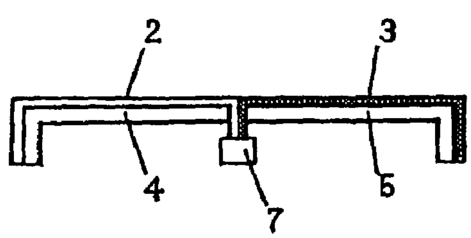
FIG. 9 is a D—D sectional view of the multilayer molded article shown in FIG. 8.

FIG. 9 shows a sectional view, along line D—D shown in FIG. 8, of the multilayer molded article shown in FIG. 8 wherein the first portion (4) of the substrate underlying the first skin material (2) and the second portion (5) of the substrate underlying the second skin material (3) are not combined via the ribs, and in this section, the two portions (4), (5) of the substrate are completely separated from each other and the resin bridge (7) is present away from the substrate and in the vicinity of the ends of the folded edges (10) of the two skin materials, the folded edges (10) extending from the meeting line (8) between the skin materials.

Figure 10:
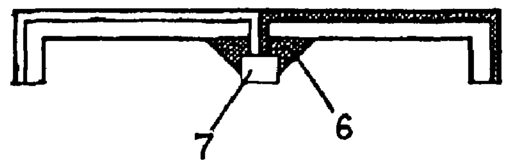
FIG. 10 is an E—E sectional view of the multilayer molded article shown in FIG. 8.

FIG. 10 shows a section, along line E—E shown in FIG. 8, of the multilayer molded article shown in FIG. 8 wherein the first portion (4) of the substrate underlying the first skin material (2) and the second portion (5) of the substrate underlying the second skin material (3) are combined via the ribs (6). The two portions (4), (5) are combined via the ribs (6) which are combined through the resin bridge (7) to form a substrate the strength of which is greater than that of a substrate combined with ribs which are not combined through a resin bridge.

Figure 11:
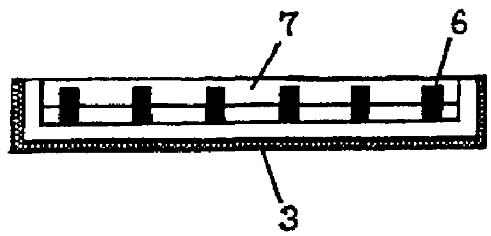
FIG. 11 is an F—F sectional view of the multilayer molded article shown in FIG. 8.
Figure 12:
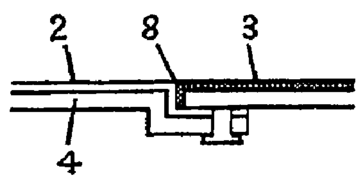
FIG. 12 shows one example of a partial section of a multilayer molded article in the prior art.
Figure 13:
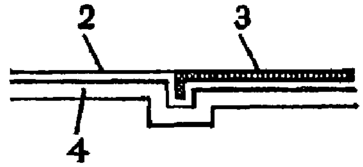
FIG. 13 shows another example of a partial section of a multilayer molded article in the prior art.

FIG. 11 shows a sectional view, along line F—F shown in FIG. 8, of the multilayer molded article shown in FIG. 8, viewed from the side of the second portion (5) of the substrate underlying the back of the second skin material (3). The ribs (6) are arranged at suitable intervals to combine both the portions of the substrate and simultaneously the ribs (6) are combined via the resin bridge (7) both ends of which are connected to the frame-like walls of the multilayer molded article (1), thus a greater strength of the product is achieved. In FIGS. 8 to 11, the ribs (6) are smeared as distinct from the resin bridge (7) so that the relationship of the ribs (6) and the resin bridge (7) can easily be understood. However, the ribs, the substrate and the resin bridge have actually been completely integrated together, because these components are molded together from a thermoplastic resin.

Because a larger size of the resin bridge (7) leads to an increase in the weight and cost of the product, the resin bridge is preferably as small as possible as long as the strength of the product is secured. This resin bridge may be completely separated from the ends of the two skin materials, or the ends of the two skin materials may be enclosed partially in the resin bridge.

In the foregoing description, the multilayer molded articles having two kinds of skin materials laminated have been described, but the number of the kinds of skin materials employed in the present invention is not limited to two. As long as the different skin materials adjacent to each other may be laminated to and integrated with a substrate and the above-described structure is formed in a region where two skin materials meet, three kinds of skin materials may be laminated as shown in FIG. 14, and as a matter of course, four or more skin materials adjacent to each other may be laminated along a plurality of meeting lines between the skin materials.

When three or more kinds of skin materials are laminated to a substrate along their meeting lines in the multilayer molded article of the present invention, the above-mentioned structure where a portion of the substrate underlying a skin material and another portion of the substrate underlying another skin material are combined via ribs of the aforementioned structure must be formed along at least one of the meeting lines. However, depending, for example, on the intended use of the multilayer molded article, the aforementioned structure where two portions of the substrate are combined via ribs does not have to be formed along the remaining meeting line, and therefore, some portions of the substrate may be jointed by joining techniques known in the art.

Figure 14:
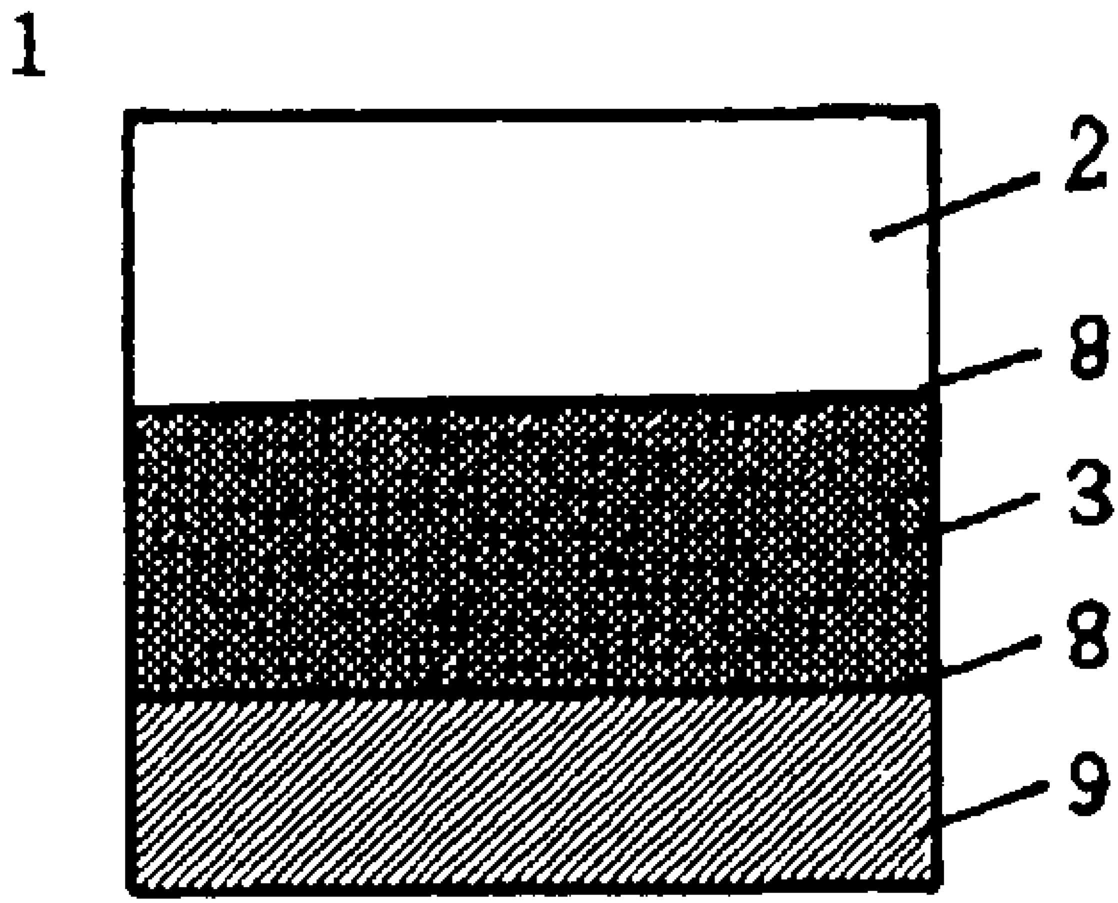
FIG. 14 shows a plan view of one example of the multilayer molded article of the present invention having three skin materials laminated when viewed from the skin material side.

For example, a multilayer molded article having three kinds of skin materials laminated to its substrate as shown in FIG. 14 has two meeting lines between the skin materials including a meeting line between skin materials (2) and (3) and a meeting line between skin materials (3) and (9). In this multilayer molded article, a conventional jointing technique may be employed along one of the two meeting lines.

The skin materials used in the multilayer molded article of the present invention include textiles and knitted webs such as moquette and tricot, nonwoven fabrics such as needle punch carpets, metal foils, and sheets and films of thermoplastic resins and sheets and films of thermoplastic elastomers.

Although the skin material may be, as needed, a two-layer or more laminated skin material having a foamed layer or a backing layer laminated therein, the skin material should be capable of being heat-fused with thermoplastic resin or being impregnated on the back thereof with thermoplastic resin in a molten state, thus being permitted to be bonded integrally to the substrate.

In this case, the foamed sheet includes foams of polyolefins such as polypropylene and polyethylene, polyvinyl chloride foams, and soft or semi-rigid polyurethane foams.

The backing layer includes nonwoven fabrics and sheets and films of synthetic resin. The fibers constituting the nonwoven fabrics includes natural fibers such as cotton, hair, silk and hemp or synthetic resin fibers such as polyamine fiber, polyester fiber and nylon fiber. These fibers are used alone, or nonwoven fabrics produced by blending these fibers are used. Examples of the nonwoven fabrics are those produced by needle punching, thermal bonding, spun bonding, melt blowing or spun lacing. The sheets and films of synthetic resin include sheets and films made of thermoplastic resins such as polypropylene and polyethylene or of polyolefin-based thermoplastic elastomers. These should be capable of being heat-fused with the thermoplastic resin used as the substrate resin.

In the present invention, the "at least two kinds of skin materials" include not only those different in their materials, but also those different in color, design or texture made of the same material.

The thermoplastic resin used in the present invention is a resin usually used in compression molding, injection molding, extrusion molding etc., and includes e.g. general thermoplastic resins such as polypropylene, polyethylene, acrylonitrile-styrene-butadiene block copolymers, polystyrene, polyamides such as nylon, polyvinyl chloride, polycarbonate, acrylic resin, and styrene-butadiene block copolymers, thermoplastic elastomers such as EPM and EPDM, mixtures thereof, and polymer alloys using these resins, which may be non-formable or formable.

Further, these thermoplastic resins may contain, if needed, glass fibers, various inorganic or organic fillers used usually. Further, various additives such as pigments, lubricants, antistatic agents and stabilizers may also be blended therewith.

Multilayer molded articles are also disclosed in Japanese Patent Application No. 2000-037588, filed Feb. 16, 2000, the complete disclosure of which is incorporated herein by reference.

A multilayer molded article of the present invention comprising a thermoplastic resin substrate and two kinds of skin materials laminated on the substrate can be produced easily by conventional molding techniques such as injection molding, injection pressing, and compression molding by use of a mold comprising a pair of male and female dies, said dies forming a cavity constituting a predetermined product shape, having a pinching portion that can make two kinds of skin materials overlap and can pinch the ends of the two skin materials along their meeting line, and having concaves for forming ribs. In injection molding, however, the skin materials are heated and pressurized directly by a molten resin supplied, so a significant damage to the skin materials is caused. Accordingly, injection pressing molding or extrusion molding wherein the damage to the skin materials can be reduced by clamping after supplying the melted resin can be used more preferably.

Multilayer molded articles having three or more kinds of skin materials can also be produced in a manner similar to that described above.

As described in detail above, the multilayer molded article of the present invention comprises a substrate of a thermoplastic resin and at least two kinds of skin materials laminated integrally to the surface of substrate wherein the at least two kinds of skin materials include a pair of skin materials meet together along a line, which is called a meeting line, between them and the pair of skin materials are folded along the meeting line toward the substrate to have folded edges overlapping each other. The substrate has portions separated with the folded edges of the pair of skin materials and the portions separated are combined together via a plurality of ribs molded integrally with the portions of the substrate. The ends of the folded edges of the pair of skin materials are enclosed in the ribs. The multilayer molded article may have a resin bridge combining the ribs. The multilayer molded article having such structure has both great strength and good appearance due to the plurality of ribs firmly combining the portions of the substrate. Such a multilayer molded article can thus be used in a Wide variety of utilities including interior parts in automobiles.

What is claimed is:

1. A multilayer molded article comprising:

a thermoplastic resin substrate having a first surface and a second surface opposite to the first surface, and at least two kinds of skin materials laminated on the first surface of the substrate, the at least two kinds of skin materials including a pair of skin materials adjacent to each other, wherein the pair of skin materials are folded, along a line along which the pair of skin materials meet together, toward the substrate so as to have folded edges that separate the substrate at least partly to define a portion on which one of the pair of skin materials is laminated and another portion on which the other one of the pair of skin materials is laminated, wherein the separated portions of the substrate are combined together via a plurality of ribs of the thermoplastic resin molded integrally with the substrate, the ribs enclosing therein a part of the folded edges of the pair of skin materials.

2. The multilayer molded article according to claim 1, wherein the ribs are combined via a resin bridge that is molded together with the ribs and is present away from the substrate.

3. A multilayer molded article comprising:

a thermoplastic resin substrate having a first surface and a second surface opposite to the first surface, and at least two kinds of skin materials laminated on the first surface of the substrate, the at least two kinds of skin materials including a pair of skin materials adjacent to each other, wherein the pair of skin materials are folded, along a line along which the pair of skin materials meet together, toward the substrate so as to have folded edges that are in a facing relationship so as to separate the substrate to thereby at least partly define a portion of the substrate on which one of the pair of skin materials is laminated and another portion of the substrate on which the other one of the pair of skin materials is laminated, wherein the separated portions of the substrate are connected together via at least one rib formed from thermoplastic resin, the at least one rib being molded integrally with the substrate, the at least one rib enclosing therein a part of the folded edges of the pair of the skin materials.

* * * * *